US012812586B2

(12) United States Patent
Barbu et al.

(10) Patent No.: US 12,812,586 B2
(45) Date of Patent: Nov. 24, 2026

(54) ROBUST SAMPLE AGGREGATION FOR ML POSITIONING

(71) Applicant: Nokia Technologies Oy, Espoo (FI)

(72) Inventors: Oana-Elena Barbu, Aalborg (DK); Sajad Rezaie, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 234 days.

(21) Appl. No.: 18/435,687

(22) Filed: Feb. 7, 2024

(65) Prior Publication Data

US 2024/0276425 A1 Aug. 15, 2024

(30) Foreign Application Priority Data

Feb. 9, 2023 (FI) .................................... 20235132

(51) Int. Cl.
*H04W 64/00* (2009.01)
*G01S 5/02* (2010.01)
(Continued)

(52) U.S. Cl.
CPC ........... *H04W 64/00* (2013.01); *G01S 5/0205* (2013.01); *G01S 5/0278* (2013.01); *G06N 3/08* (2013.01);
(Continued)

(58) Field of Classification Search
CPC ... H04W 64/00; H04W 24/10; H04W 64/003; H04W 64/006; H04L 5/0051;
(Continued)

(56) References Cited

U.S. PATENT DOCUMENTS 11,533,700 B2 12/2022 Duan et al.
2022/0003830 A1 1/2022 Cha et al.
(Continued)

FOREIGN PATENT DOCUMENTS

WO 2021/125631 A1 6/2021
WO 2022/031659 A1 2/2022

OTHER PUBLICATIONS

"New WID on Expanded and Improved NR Positioning", 3GPP TSG RAN Meeting #98-e, RP-223549, Agenda Item: 9.1.1, Intel Corporation, Dec. 12-16, 2022, pp. 1-7.
(Continued)

*Primary Examiner* — Angela Widhalm De Rodriguez
(74) *Attorney, Agent, or Firm* — Carter, DeLuca & Farrell LLP

(57) ABSTRACT

A node receives and measures reference signals for determining positioning information corresponding to a UE. The node applies a function to the measured reference signals to form an output corresponding to a fixed set of input features and determines the positioning information of the UE using the output. The node sends a measurement report, including indication of the positioning information, from the node toward a further node. A further node sends to the node indication of a function to be used by the node to apply to positioning reference signals to form an output of a fixed set of input features used to determine positioning information for a UE. The further node receives a measurement report including at least indication of the positioning information based at least on the positioning reference signals and the function and updates at least the function based at least on the measurement report.

1 Claim, 7 Drawing Sheets

(51) Int. Cl.
*G06N 3/08* (2023.01)
*G06N 20/00* (2019.01)
*H04L 5/00* (2006.01)
*H04W 24/10* (2009.01)

(52) U.S. Cl.
CPC ........... *G06N 20/00* (2019.01); *H04L 5/0048* (2013.01); *H04L 5/0051* (2013.01); *H04W 24/10* (2013.01); *H04W 64/003* (2013.01); *H04W 64/006* (2013.01)

(58) Field of Classification Search
CPC ... H04L 5/0048; G01S 5/0205; G01S 5/0278; G06N 3/08; G06N 20/00
See application file for complete search history.

(56) References Cited

U.S. PATENT DOCUMENTS

2022/0044091 A1* 2/2022 Sundararajan ........ G01S 5/0278
2022/0053411 A1* 2/2022 Bao ........................ H04W 24/02
2022/0150865 A1 5/2022 Cha et al.
2022/0232509 A1* 7/2022 Barbu ................... G01S 5/0278
2022/0394655 A1 12/2022 Shreevastav et al.

OTHER PUBLICATIONS

"Moderator's summary for discussion [98e-13-R18-AIML-Air]", 3GPP TSG RAN#98-e, RP-223494, Agenda Item: 9.2.8, RAN1 VC, Dec. 12-16, 2022, 6 pages.
"New SI: Study on Artificial Intelligence (AI)/Machine Learning (ML) for NR Air Interface", 3GPP TSG RAN Meeting #94e, RP-213599, Agenda Item: 8.6.1, Qualcomm, Dec. 6-17, 2021, 6 pages.
"3rd Generation Partnership Project; Technical Specification Group Radio Access Network; NR; Physical channels and modulation (Release 17)", 3GPP TS 38.211, V17.4.0, Dec. 2022, pp. 1-136.
"Evaluation on AI/ML for positioning accuracy enhancement", 3GPP TSG-RAN WG1 Meeting #109-e, R1-2204242, Agenda Item: 9.2.4.1, Apple Inc., May 9-20, 2022, 7 pages.
"AI and ML for positioning enhancement", 3GPP TSG-RAN WG1 Meeting #110, R1-2206524, Agenda Item: 9.2.4.2, NVIDIA, Aug. 22-26, 2022, 7 pages.
"Evaluation on AI/ML for positioning accuracy enhancement", 3GPP TSG RAN WG1 Meeting #110, R1-2205915, Agenda item: 9.2.4.1, Purple Mountain Laboratories, Aug. 22-26, 2022, 6 pages.
Msc-Generator, Sourceforge, Retrieved on Jun. 3, 2024, Webpage available at : https://sourceforge.net/projects/msc-generator/.
"3rd Generation Partnership Project; Technical Specification Group Radio Access Network; LTE Positioning Protocol (LPP) (Release 17)", 3GPP TS 37.355, V17.2.0, Sep. 2022, pp. 1-347.
"3rd Generation Partnership Project; Technical Specification Group Radio Access Network; NG-RAN; NR Positioning Protocol A (NRPPa) (Release 17)", 3GPP TS 38.455, V17.3.0, Dec. 2022, pp. 1-201.
Auer et al., "Pilot Aided Channel Estimation for OFDM: A Separated Approach for Smoothing and Interpolation", Proceedings of the 40th IEEE International Conference on Commununications (ICC), 2005, pp. 2173-2178.
Finnish Application No. 20235159, "Aiml Positioning Receiver for Flexible Carrier Aggregation", filed on Feb. 15, 2023, pp. 1-50.
"Evaluation on ML for positioning accuracy enhancement", 3GPP TSG RAN WG1 #112 Meeting, R1-2300608, Agenda item: 9.2.4.1, Nokia, Feb. 27-Mar. 3, 2023, 23 pages.
Keating et al., "Overview of Positioning in 5G New Radio", 16th International Symposium on Wireless Communication Systems (ISWCS), Aug. 27-30, 2019, pp. 320-324.
Office Action received for corresponding Finnish Patent Application No. 20235132, dated Aug. 7, 2023, 10 pages.
"Other aspects on AI/ML for positioning accuracy enhancement", 3GPP TSG RAN WG1 #110, R1-2206037, Agenda Item: 9.2.4.2, vivo, Aug. 22-26, 2022, 17 pages.
"Other aspects on AI-ML for positioning accuracy enhancement", 3GPP TSG RAN WG1 #111, R1-2212113, Agenda item: 9.2.4.2, Qualcomm Incorporated, Nov. 14-18, 2022, pp. 1-24.
Extended European Search Report received for corresponding European Patent Application No. 24150353.1, dated Jul. 4, 2024, 12 pages.

* cited by examiner

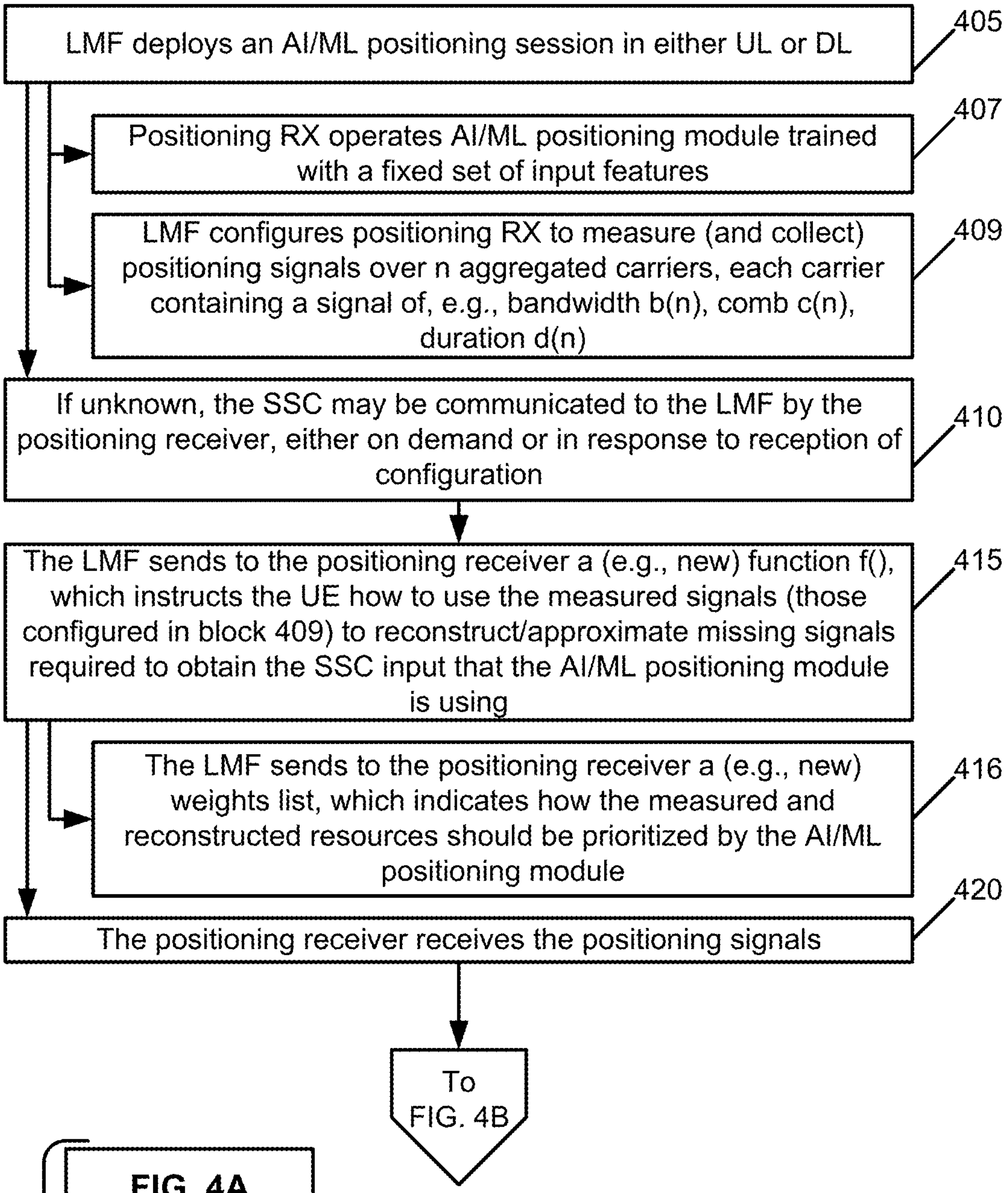
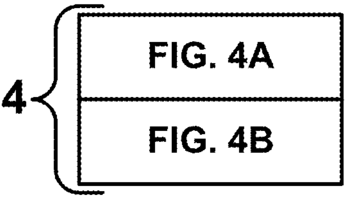
FIG. 4
FIG. 4A

ROBUST SAMPLE AGGREGATION FOR ML POSITIONING

TECHNICAL FIELD

Exemplary embodiments herein relate generally to wireless communications systems and, more specifically, relate to positioning using artificial intelligence (AI)/machine learning (ML) in wireless communications systems.

BACKGROUND

In new wireless communication systems such as 5G (fifth generation), positioning of devices connected to the network is becoming more important. In particular, 5G positioning is a component in many anticipated 5G industrial use cases, such as logistics, smart factories, autonomous vessels and vehicles, localized sensing, digital twins (where the real environment is reproduced in a digital environment), and augmented and virtual reality, among others.

The use of artificial intelligence (AI)/machine learning (ML) modules is also becoming more important in many fields, including wireless communications systems. In particular, AI/ML modules have been applied to positioning, for instance to determine positioning of UEs (user equipment) in the network.

In order for the AI/ML positioning modules to work well, they have to be trained using appropriate input. While this input is known, there can be issues using the information.

BRIEF SUMMARY

This section is intended to include examples and is not intended to be limiting.

In an exemplary embodiment, a method is disclosed that includes receiving, by a node in a wireless communications system from another node in the wireless communications system, reference signals for determining positioning information corresponding to a user equipment in the wireless communication system. The method includes measuring, by the node, the reference signals and applying, by the node, a function to the measured reference signals to form an output corresponding to a fixed set of input features. The method includes determining, by the node, the positioning information of the user equipment using the output, and sending a measurement report, comprising indication of the positioning information, from the node toward a further node in the wireless communications system.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform: receiving, by a node in a wireless communications system from another node in the wireless communications system, reference signals for determining positioning information corresponding to a user equipment in the wireless communication system; measuring, by the node, the reference signals; applying, by the node, a function to the measured reference signals to form an output corresponding to a fixed set of input features; determining, by the node, the positioning information of the user equipment using the output; and sending a measurement report, comprising indication of the positioning information, from the node toward a further node in the wireless communications system.

An exemplary computer program product includes a computer-readable storage medium bearing instructions that, when executed by an apparatus, cause the apparatus to perform at least the following: receiving, by a node in a wireless communications system from another node in the wireless communications system, reference signals for determining positioning information corresponding to a user equipment in the wireless communication system; measuring, by the node, the reference signals; applying, by the node, a function to the measured reference signals to form an output corresponding to a fixed set of input features; determining, by the node, the positioning information of the user equipment using the output; and sending a measurement report, comprising indication of the positioning information, from the node toward a further node in the wireless communications system.

In another exemplary embodiment, an apparatus comprises means for performing: receiving, by a node in a wireless communications system from another node in the wireless communications system, reference signals for determining positioning information corresponding to a user equipment in the wireless communication system; measuring, by the node, the reference signals; applying, by the node, a function to the measured reference signals to form an output corresponding to a fixed set of input features; determining, by the node, the positioning information of the user equipment using the output; and sending a measurement report, comprising indication of the positioning information, from the node toward a further node in the wireless communications system.

In an exemplary embodiment, a method is disclosed that includes, for a wireless communications system where a node measures positioning reference signals sent from another node, sending from a further node in the wireless communications system to the node indication of a function to be used by the node to apply to positioning reference signals to form an output of a fixed set of input features used to determine positioning information for a user equipment in the wireless communications system. The method also includes receiving, by the further node, a measurement report comprising at least indication of the positioning information based at least on the positioning reference signals and the function. The method additionally includes, by the further node, updating at least the function based at least on the measurement report.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform: for a wireless communications system where a node measures positioning reference signals sent from another node, sending from a further node in the wireless communications system to the node indication of a function to be used by the node to apply to positioning reference signals to form an output of a fixed set of input features used to determine positioning information for a user equipment in the wireless communications system; receiving, by the further node, a measurement report comprising at least indication of the positioning information based at least on the positioning reference signals and the function; and updating, by the further node, at least the function based at least on the measurement report.

An exemplary computer program product includes a computer-readable storage medium bearing instructions that, when executed by an apparatus, cause the apparatus to perform at least the following: for a wireless communications system where a node measures positioning reference signals sent from another node, sending from a further node in the wireless communications system to the node indication of a function to be used by the node to apply to positioning reference signals to form an output of a fixed set of input features used to determine positioning information for a user equipment in the wireless communications system; receiving, by the further node, a measurement report comprising at least indication of the positioning information based at least on the positioning reference signals and the function; and updating, by the further node, at least the function based at least on the measurement report.

In another exemplary embodiment, an apparatus comprises means for performing: for a wireless communications system where a node measures positioning reference signals sent from another node, sending from a further node in the wireless communications system to the node indication of a function to be used by the node to apply to positioning reference signals to form an output of a fixed set of input features used to determine positioning information for a user equipment in the wireless communications system; receiving, by the further node, a measurement report comprising at least indication of the positioning information based at least on the positioning reference signals and the function; and updating, by the further node, at least the function based at least on the measurement report.

BRIEF DESCRIPTION OF THE DRAWINGS

In the drawings:

configurations for PRS resources in a PRB, where the position and number of the allocated REs are different, and FIG. 2A illustrates $$\{L_{PRS}, K_{comb}^{PRS}\} = \{4, 4\}$$

while FIG. 2B illustrates $$\{L_{PRS}, K_{comb}^{PRS}\} = \{12, 6\};$$

FIG. 4, split over FIGS. 4A and 4B, is a logic flow diagram for robust sample aggregation for ml positioning.

DETAILED DESCRIPTION OF THE DRAWINGS

Figure 1A:
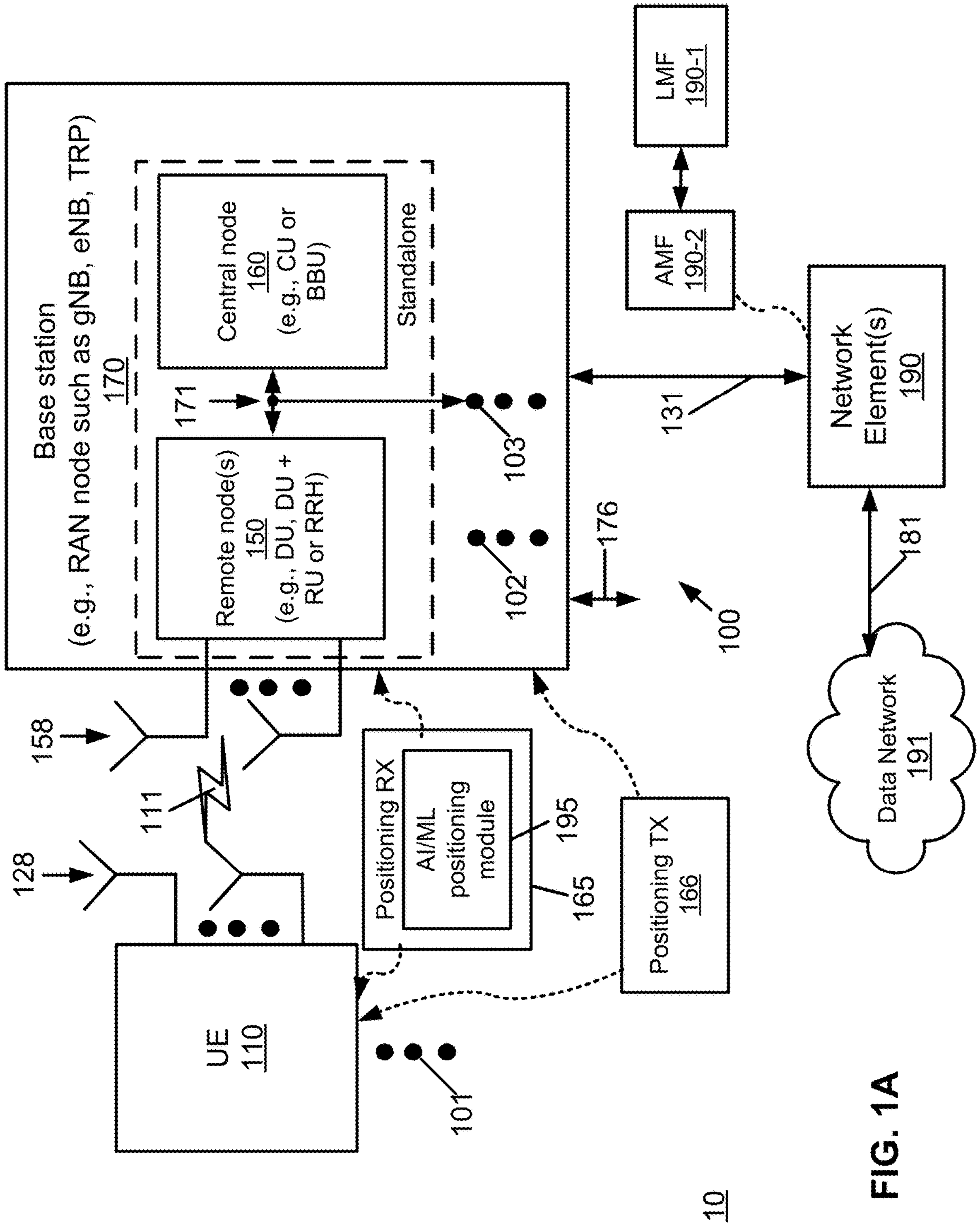
FIG. 1A is a block diagram of one possible and non-limiting example wireless communications system in which example embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "/" may be interpreted as "or", "and", or "both".

As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Figure 4B:
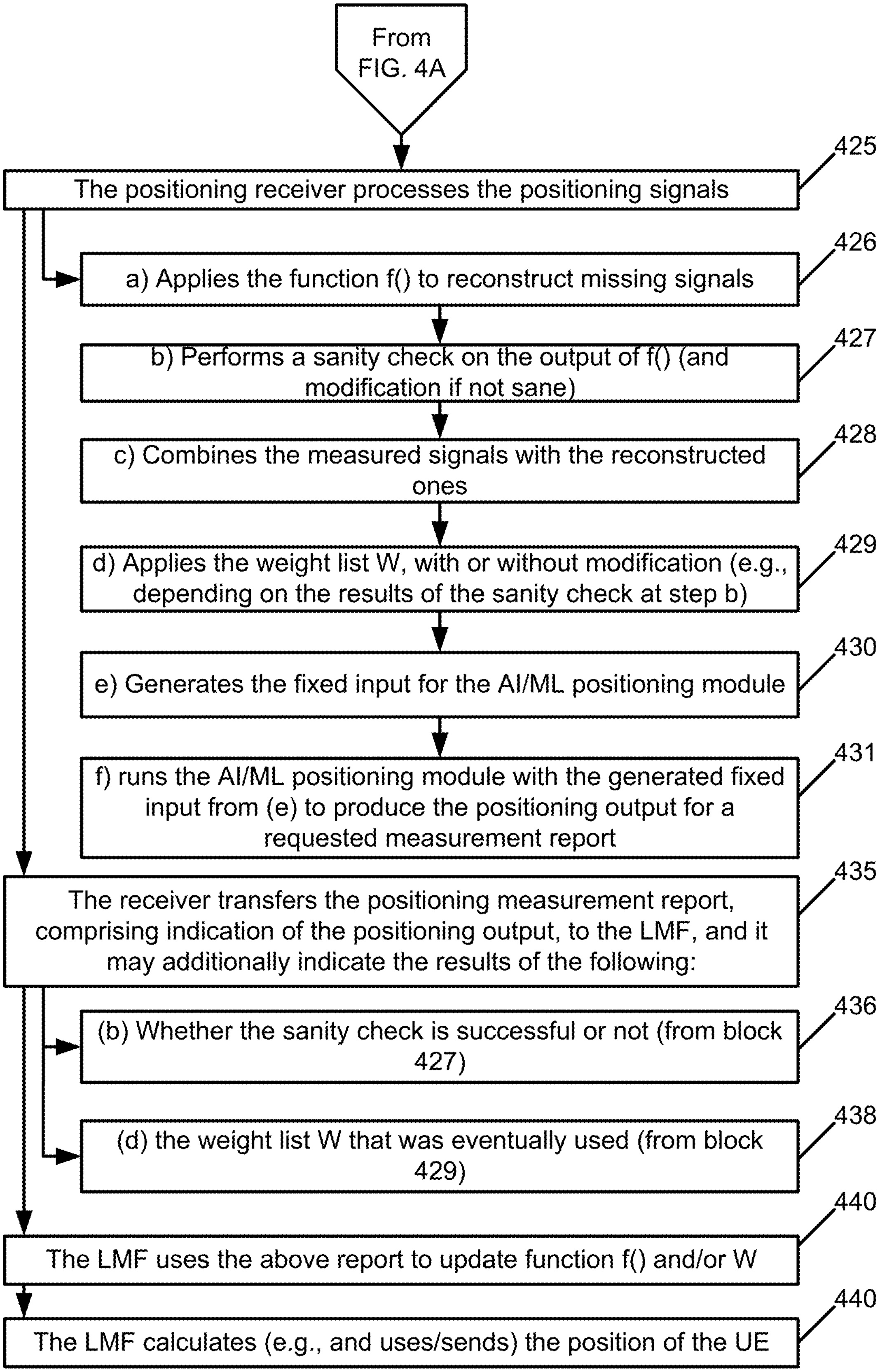

Any flow diagram (such as FIG. 4) or signaling diagram (such as FIG. 5) herein is considered to be a logic flow diagram, and illustrates the operation of an exemplary method, results of execution of computer program instructions embodied on a computer readable memory, functions performed by logic implemented in hardware, and/or interconnected means for performing functions in accordance with an exemplary embodiment.

The exemplary embodiments herein describe techniques for robust sample aggregation for ML positioning. Additional description of these techniques is presented after a system into which the exemplary embodiments may be used is described.

FIG. 1A illustrates an example wireless communications system 10 in which one or more example embodiments may be practiced. A number of nodes are shown: a user equipment (UE) 110; a base station 170; and network element(s) 190, and all of these nodes are part of the wireless communications system 10. The base station 170 and the network element(s) 190 are part of the wireless network 100, but the UE 110 is not.

In FIG. 1A, a user equipment (UE) 110, as one of the nodes in the wireless communications system 10, is in wireless communication via wireless link 111 with a wireless network 100. The UE 110 is a wireless, typically mobile device that can access a wireless network. The UE 110 is illustrated with one or more antennas 128. The ellipses 101 indicate there may be multiple UEs 110.

The base station 170, as another of the nodes in the wireless communications system 10, provides access by wireless devices such as the UE 110 to the wireless network 100. It is noted that the base station 170 may also be referred to by other names, such as an access point or transmission-reception (or transmit-receive) point (TRP). The base station 170 is illustrated as having one or more antennas 158. There are many options for the base station 170. In general, the base station 170 may be a RAN (radio access network) node, and in particular may be a TRP, which is the primary term used herein. That is, the base station 170 will be referred to as TRP 170. A TRP can be any NR element whose location is known: a gNB, a roadside unit, and many more. There are, however, additional options including an eNB (evolved node B, e.g., an LTE, long-term evolution, base station) for the base station, or options other than cellular systems.

There are a number of configurations for the base station 170. One such is a "standalone" configuration, which includes all circuitry as part of a single unit, and accesses the antennas 158. More commonly today, circuitry is split into one or more remote nodes 150 (accessing antennas 158) and central nodes 160. For instance, for 5G (fifth generation), a gNB might include a distributed unit (DU), or DU and radio unit (RU) as the remote nodes(s), and a central unit (CU) as the central node 160. For LTE, the base station 170 might include an eNB having a RRH (remote radio head) as remote node 150 and a base band unit (BBU) as a central node. The remote node(s) 150 are coupled to a central node 160 via one or more links 171. There may be multiple remote nodes 150 for a single central node 160, and this is indicated by ellipses 102, indicating multiple remote nodes, and ellipses 103, indicating additional links 171. The remote nodes 150 are remote in the sense they are contained in different physical enclosures from a physical enclosure containing a corresponding central node 160. The link(s) 171 may be implemented using fiber optics, wireless techniques, or any other technique for data communications.

Two or more base stations 170 communicate using, e.g., link(s) 176. The link(s) 176 may be wired or wireless or both and may implement, e.g., an Xn interface for 5G, an X2 interface for LTE, or other suitable interface for other standards.

The wireless network 100 may include a network element or elements 190, as a third illustrated node (or nodes) of the wireless communications system 10, that may include core network functionality, and which provides connectivity via a link or links 181 with a data network 191, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity) functionality and/or SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an SI interface for LTE, or other suitable interface for other standards.

In the examples herein, functions include an LMF 190-1 and an AMF 190-2. The LMF 190-1 is a 5G entity, and may be connected to the base station 170 via the AMF 190-2. The LMF is only one example of a device that uses location information. In the examples herein, mainly three entities are described, which are shown in more detail in FIG. 5, but include the LMF 190-2, a positioning receiver (RX) 165, and a positioning transmitter (TX) 166. The positioning receiver 165 and transmitter 166 change based on whether UL or DL is being considered. In UL, the positioning receiver 165 could be the base station 170 and the positioning transmitter 166 could be the UE 110. In DL, the positioning receiver 165 could be the UE 110 and the positioning transmitter 166 could be the base station 170.

One option for the base station 170 to communicate with the LMF 190-1 is using NR positioning protocol A (NRPPa), which was introduced to carry the positioning information between, e.g., a NG-RAN (as base station 170) and LMF 190-1 over, e.g., a next generation control plane interface (NG-C) via the AMF 190-2. The LMF 190-1 may configure the UE using the LTE positioning protocol (LPP) (e.g., via the AMF 190-2). The base station 170 may configure the UE using radio resource control (RRC) protocol over LTE-Uu and NR-Uu.

Figure 1B:
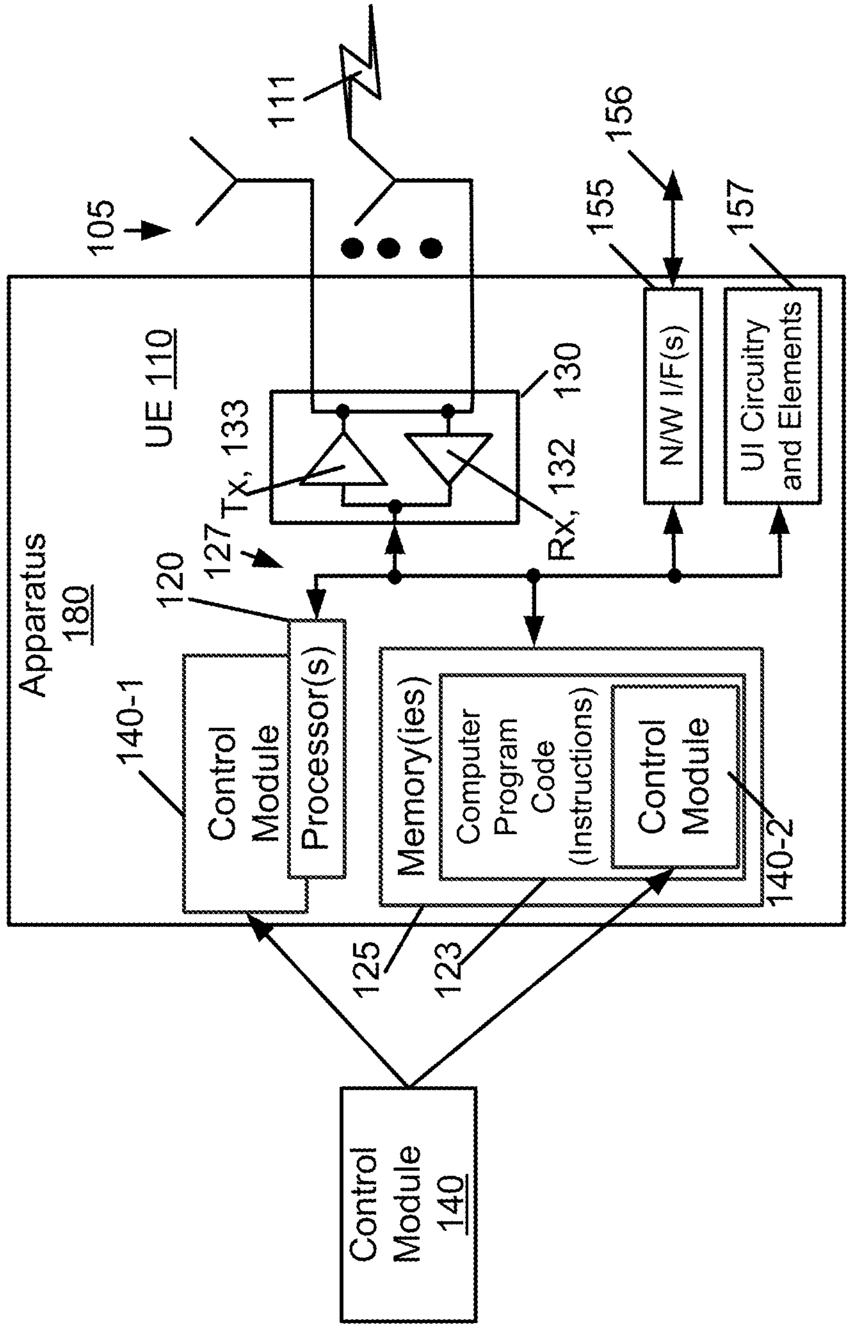
FIG. 1B is a block diagram of an example apparatus suitable for implementing any of the nodes in FIG. 1A.

FIG. 1B illustrates an example apparatus 180 suitable for implementing any of the nodes in FIG. 1A. The apparatus 180 includes circuitry comprising one or more processors 120, one or more memories 125, one or more transceivers 130, one or more network interface(s) 155 and user interface (UI) circuitry and elements 157, interconnected through one or more buses 127. Since this is an example covering all of the nodes in FIG. 1A, some of the nodes may not have all of the circuitry. For example, a base station 170 might not have UI circuitry and elements 157. All of the nodes may have additional circuitry, not described here. FIG. 1B is presented merely as an example.

Each of the one or more transceivers 130 includes a receiver, Rx, 132 and a transmitter, Tx, 133. The one or more buses 127 may be address, data, and/or control buses, and may include any interconnection mechanism, such as a series of lines on a motherboard or integrated circuit, fiber optics or other optical communication equipment, and the like. The one or more transceivers 130 are connected to one or more antennas 105, which may be one of the antennas 128 (from UE 110) or antennas 158 (from base station 170), and may communicate using the wireless link 111.

The one or more memories 125 include computer program code 123. The apparatus 180 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code (having corresponding instructions) 123 and is executed by the one or more processors 120. For instance, the one or more memories 125 store instructions that, when executed by the one or more processors 120, cause the apparatus 180 to perform one or more of the operations as described herein. Furthermore, the one or more processors 120, one or more memories 125, and example algorithms (e.g., as flowcharts and/or signaling diagrams), encoded as instructions, programs, or code, are means for causing performance of the operations described herein.

The network interface(s) 155 are wired interfaces communicating using link(s) 156, which may be fiber optic or other wired interfaces. The link(s) 156 may be the link(s)

131 and/or 176 from FIG. 1A. The link(s) 131 and/or 176 from FIG. 1A may also be implemented using transceiver(s) 130 and corresponding wireless link(s) 111. The apparatus 180 may include only wireless transceiver(s) 130, only network interface(s) 155, or both wireless transceiver(s) 130 and network interface(s) 155.

The apparatus 180 may or may not include UI circuitry and elements 157. These may include a display such as a touchscreen, speakers, or interface elements such as for headsets. For instance, a UE 110 of a smartphone would typically include at least a touchscreen and speakers. The UI circuitry and elements 157 may also include circuitry to communicate with external UI elements (not shown) such as displays, keyboards, mice, headsets, and the like.

The computer readable memories 125 may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 125 may be means for performing storage functions. The processors 120 may be of any type suitable to the local technical environment, and may include one or more of general-purpose computers, special purpose computers, microprocessors, digital signal processors (DSPs) and processors based on a multi-core processor architecture, as non-limiting examples. The processors 120 may be means for performing functions, such as controlling the apparatus 180, and other functions as described herein.

Having thus introduced one suitable but non-limiting technical context for the practice of the exemplary embodiments, the exemplary embodiments will now be described with greater specificity.

An overview of the technological area applicable to the examples herein is now provided. Examples herein relate to the new Rel. 18 WID on expanded and improved NR positioning [RP-223549, Intel Corporation, CATT, Ericsson, "New WID on Expanded and Improved NR Positioning", 3GPP TSG RAN Meeting #98-c, Electronic Meeting, Dec. 12-16, 2022] and on AI/ML for the air interface [RP-223494, "Moderator's summary for discussion", 3GPP TSG RAN #98-c, 12-16, Dec. 2022].

In [RP-223549], it has been agreed to aggregate multiple intra-band contiguous carriers: "Regarding higher accuracy, two additional techniques have been considered in Rel-18: one is to take advantage of the rich 5G spectrum to increase the bandwidth for the transmission and reception of the positioning reference signals based on PRS/SRS bandwidth aggregation for intra-band contiguous carriers, and the other is to use the NR carrier phase measurements."

One of the objectives was as follows and is between opening and closing quotation marks:

"Specify bandwidth aggregation for positioning measurements across up to three intra-band contiguous carriers [RAN1, RAN2, RAN4].

Specify signalling and procedures to support aggregation of PRS/SRS (respectively) resources across positioning frequency layers (PFLs)/carriers (respectively) for positioning measurements under the assumption that the signals over aggregated resources are transmitted and received (respectively) using a single RF chain (same antenna) [RAN1, RAN2].

NOTE: The support of bandwidth aggregation for positioning measurements applies only to timing related measurements (e.g., RSTD, RTOA, and UE/gNB Rx-Tx time difference).

Specify RRM requirements with measurement gaps in connected mode, and in inactive mode, including PRS measurement period/reporting [RAN4]."

Rel-18 SI and now WI on Artificial Intelligence (AI)/Machine Learning (ML) for NR Air Interface [RP-223494 and RP-213599, Qualcomm (Moderator), "New SI: Study on Artificial Intelligence (AI)/Machine Learning (ML) for NR Air Interface", 3GPP TSG RAN Mecting #94c, Electronic Meeting, Dec. 6-17, 2021] aims at exploring the benefits of augmenting the air interface with features enabling support of AI/ML-based algorithms for enhanced performance and/or reduced complexity/overhead. This SI's target was to lay the foundation for future air-interface use cases leveraging AI/ML techniques. The initial set of use cases to be covered include CSI feedback enhancement (e.g., overhead reduction, improved accuracy, prediction), beam management (e.g., beam prediction in time, and/or spatial domain for overhead and latency reduction, beam selection accuracy improvement), and positioning accuracy enhancements.

Note that definitions for direct versus assisted positioning and collaboration levels have been defined during RAN1-109-e (shown below between opening and closing quotation marks):

"Agreement

Companies are encouraged to provide evaluation results for:

Direct AI/ML positioning

Companies are encouraged to describe at least the following implementation details for the evaluation details of the channel observation used as the input of the AI/ML model inference (e.g., type and size of model input), model input acquisition and pre-processing AI/ML assisted positioning Companies are encouraged to describe at least the following implementation details for the evaluation details of the channel observation used as the input of the AI/ML model inference (e.g., type and size of model input), model input acquisition and pre-processing details of the output of the AI/ML model inference, how the AI/ML model output is used to obtain the UE's location Agreement Companies are encouraged to study and provide inputs on potential specification impact at least for the following aspects of AI/ML approaches for sub use cases of AI/ML for positioning accuracy enhancement.

AI/ML model training training data type/size training data source determination (e.g., UE/PRU/TRP)

assistance signalling and procedure for training data collection

AI/ML model indication/configuration assistance signalling and procedure (e.g., for model configuration, model activation/deactivation, model recovery/termination, model selection)

AI/ML model monitoring and update assistance signalling and procedure (e.g., for model performance monitoring, model update/tuning)

AI/ML model inference input report/feedback of model input for inference (e.g., UE feedback as input for network side model inference)

model input acquisition and pre-processing type/definition of model input

AI/ML model inference output report/feedback of model inference output post-processing of model inference output UE capability for AI/ML model(s) (e.g., for model training, model inference and model monitoring)

Other aspects are not precluded

Note: not all aspects may apply to an AI/ML approach in a sub use case

Note2: the definitions of common AI/ML model terminologies are to be discussed in agenda 9.2.1"

In NR positioning, a positioning transmitter/receiver is required to be capable of transmitting/receiving positioning signals on n aggregated carriers, n<=N (N=3 in Rel. 18 with possibility to extend to more in further releases).

The n-th aggregated carrier may contain a positioning signal [see 3GPP TS 38.211 sections 6.4 and 7.4] which:

1. Occupies a variable bandwidth, always an integer multiple of 4 PRBs, where the minimum BW is 4 PRBs and the maximum is 272 PRBs. In other words, the signal can occupy a BW=4×PRBs, where X=1:68 and a PRB contains P=12 subcarriers.
2. Occupies a variable number of symbols, i.e., the positioning signal can be $L_{PRS}$ OFDM symbols long, where $L_{PRS}$ takes any value in the set {2, 4, 6, 12}.
3. Occupies a variable number of subcarriers in each BW, according to the comb setting. The comb $$K_{comb}^{PRS}$$

can take any value in the set C={2, 4, 6, 12}, where comb $$K_{comb}^{PRS}$$

signifies that every $$K_{comb}^{PRS}-th$$

carrier contain a positioning sample.

Note: All the combinations of $L_{PRS}$ and $$K_{comb}^{PRS}$$

PRS may not be allowed in some settings. The combination $$\{L_{PRS}, K_{comb}^{PRS}\}$$

is at least one of {2, 2}, {4, 2}, {6, 2}, {12, 2}, {4, 4}, {12, 4}, {6, 6}, {12, 6} and {12, 12}.

To conclude, a positioning signal can occupy various number of resource elements (REs) between 8=(4×12)/12×2 (for the configuration with n=1, BW=4 PRB, $L_{PRS}$=2, and $$K_{comb}^{PRS} = 12)$$

and 19584=3×(4×12×68)/2×12 (for the configuration with n=3, BW=4×68 PRB, $L_{PRS}$=12, and $$K_{comb}^{PRS} = 6),$$

where these REs can be spread over the duration of 2 to 12 OFDM symbols. Therefore, a positioning receiver may receive, throughout consecutive positioning sessions, signals with a variable number of aggregated carriers, a variable bandwidth per carrier, and variable duration.

Figure 2A:
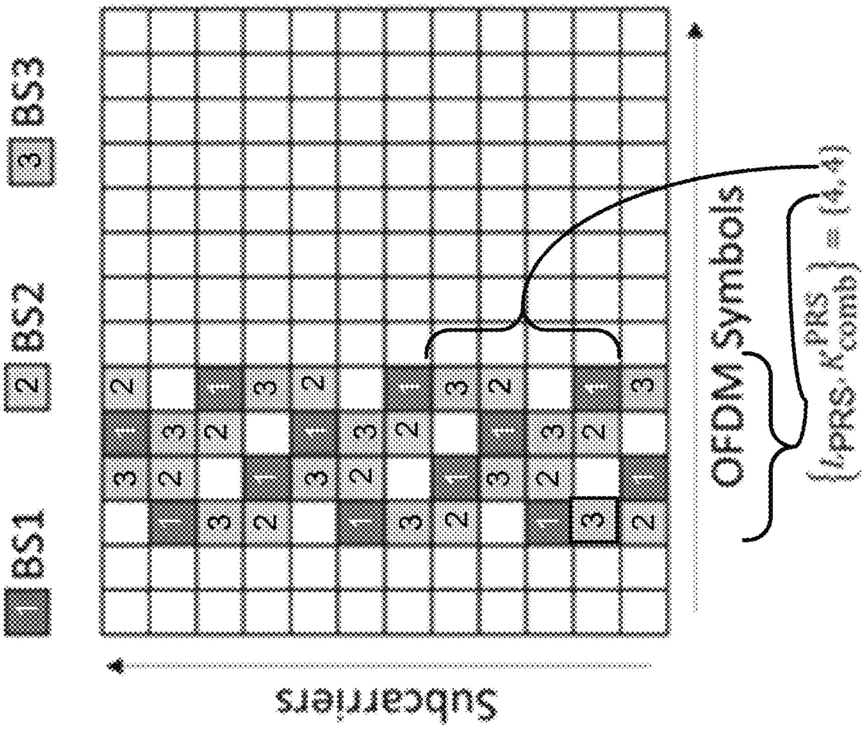
FIGS. 2A and 2B illustrate two examples of $$\{L_{PRS}, K_{comb}^{PRS}\}$$
Figure 2B:
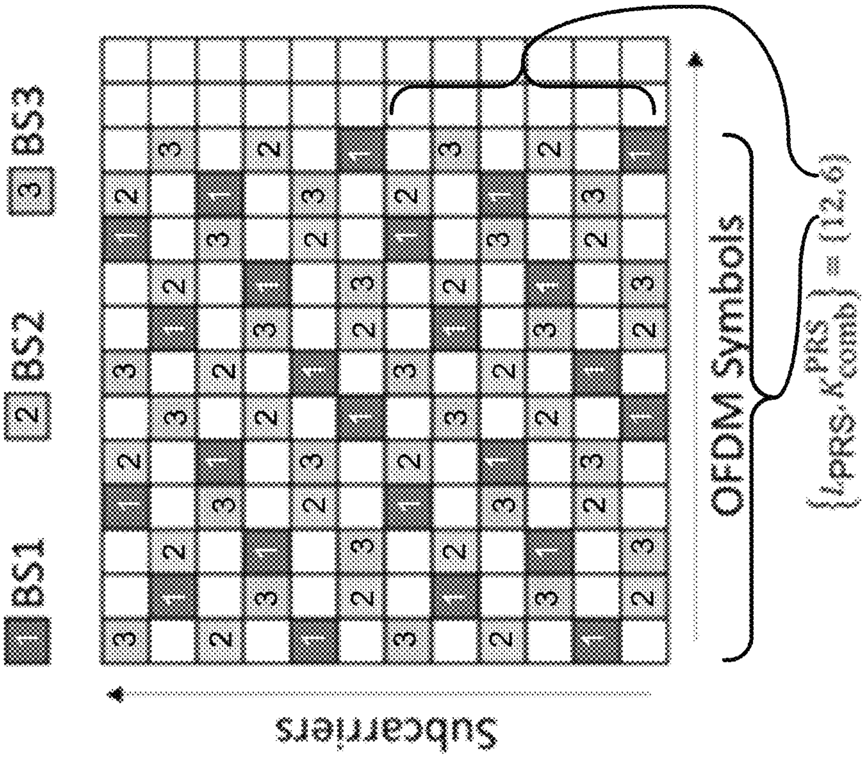

As examples, see FIGS. 2A and 2B, which illustrate two examples of $$\{L_{PRS}, K_{comb}^{PRS}\}$$

configurations for PRS resources in a PRB, where the position and number of the allocated REs are different. FIG. 2A illustrates $$\{L_{PRS}, K_{comb}^{PRS}\} = \{4, 4\}$$

while FIG. 2B illustrates $$\{L_{PRS}, K_{comb}^{PRS}\} = \{12, 6\}.$$

The $L_{PRS}$ and $$K_{comb}^{PRS}$$

are shown in one example in each figure. Resource assignment is shown for base station 1 (BS1), base station 2 (BS2), and base station 3 (BS3).

A positioning receiver able to receive these configurations should be able to extract the required positioning measurements regardless of the size of the received signal. Otherwise put, a positioning receiver, which uses AI/ML-direct/assisted positioning to accomplish this task, should ensure that the input to the AI/ML positioning module 195 meets a fixed set of input features, regardless of the size and shape of the received positioning signal (which is because the AI/ML module is trained with the fixed set of input features). That is, the input is well defined, such as via configuration of an N-dimensional matrix with complex entries, where each entry is populated according to a predefined rule, using DL reference signals (e.g., PRSs) sent by source Y, on carrier X, subcarrier (within carrier) x, symbol A, sample a (within symbol), and the like. In other words, the module may use DL reference signal (e.g., PRS) configuration to extract a fixed set of input features. Below, this fixed set of input features is characterized by fixed size and shape, or fixed size and type, or other characterizations, but regardless of characterization, the fixed set of input features is known.

Figures 3, 3A, 3B, 3C:
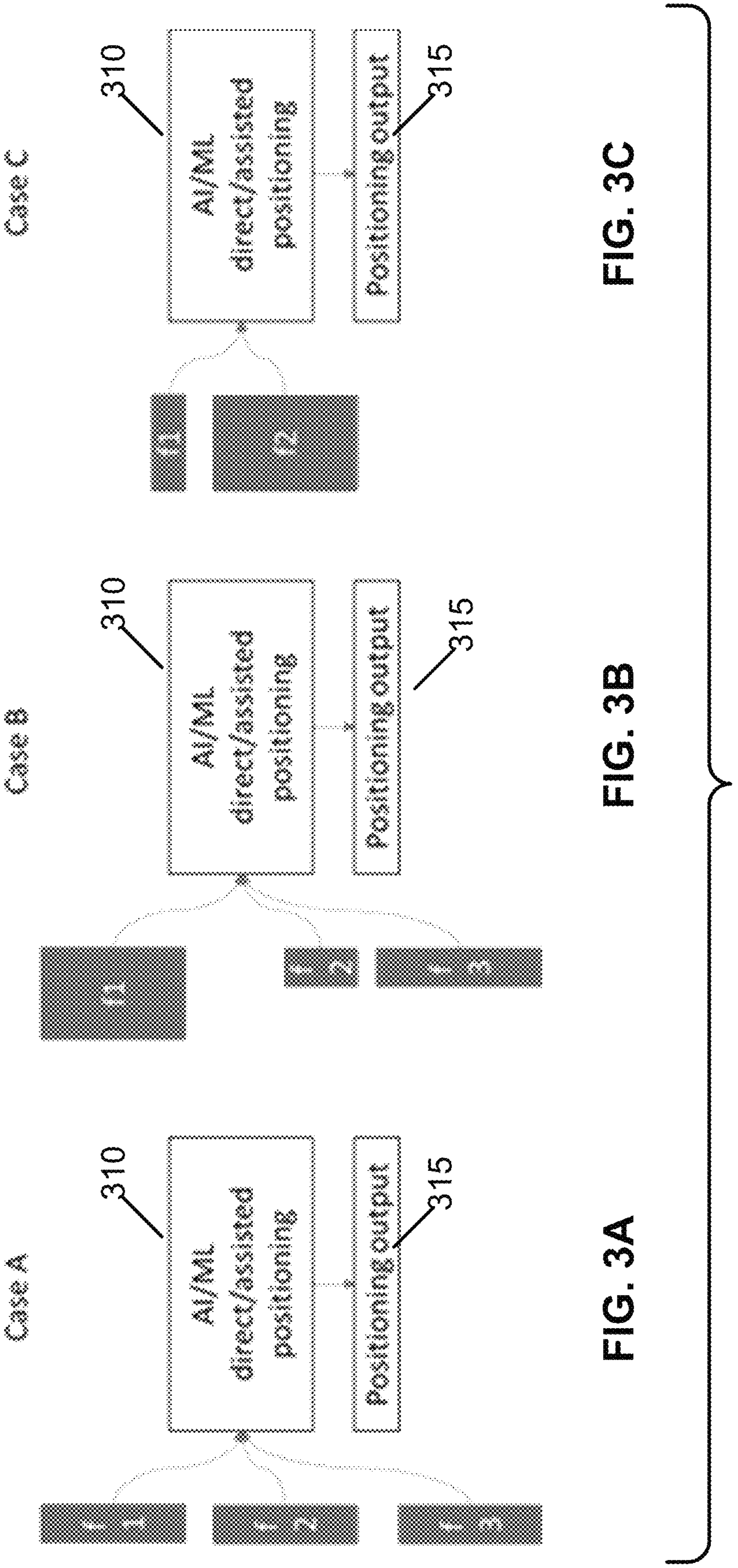
FIG. 3 includes FIGS. 3A, 3B, and 3C, which illustrate positioning signals with different BW and durations received by the same AI/ML module.

In sum, the AI/ML positioning block should be able to produce a positioning output when fed any positioning signal (with variable BW and duration) generated under the standard parameterization 1-3 as shown in FIG. 3. The frequency ranges f1, f2, and f3 refer to the frequency ranges (e.g., carriers) that the PRS signal is configured over. FIGS. 3A, 3B, and 3C illustrate positioning signals with different BW and durations received by the same AI/ML direct/ assisted positioning module 310, which produces the positioning output 315. In Case A of FIG. 3A, there are three narrow frequency ranges (f1, f2, and f3) in OFDM symbols but the same height in subcarriers. In Case B of FIG. 3B, the frequency range f1 is wider in symbols than f2 or f3, but each frequency range has a different number of subcarriers. For Case C in FIG. 3C, there are two frequency ranges, both of the same number of symbols but with large differences in the number of subcarriers. Meanwhile, the positioning output 315 is a fixed type and shape.

How to enable producing a correct positioning output for many different configurations is not a straightforward task, since it requires bringing the received signals to a common format (bandwidth-, duration- and carrier-agnostic), with minimal loss of information about the channel conditions that each signal experiences.

Herein, example solutions are proposed through which an AI/ML positioning module 195, which for example could be a neural network or other ML architecture, residing in an UL or DL positioning receiver is enabled to operate with variable input size, i.e., to produce the requested positioning output when fed with positioning signals:

1) Aggregated over a variable number of carriers; and/or
2) Of variable size in time and frequency domains.

An example relies on defining a set of new IEs for the LPP and NRPPa positioning protocols and a new behavior for the receiver using the IEs. Specifically, an example includes the following. This is described with reference to FIG. 4, split over FIGS. 4A and 4B, which is a logic flow diagram for robust sample aggregation for ML positioning.

In block 405, the LMF 190-2 deploys an AI/ML positioning session in either UL or DL. The positioning receiver (RX) 165, in block 407, operates an AI/ML positioning module 195 trained with a fixed set of input features, i.e., the input includes positioning signal samples of a selected standard configuration (SSC) with respect to, e.g., a number of aggregated carriers, bands, and durations. The model input is fixed (as a fixed set of features) and designed based on the considered SSC, which is the considered configuration for the PRS signal for which the AI/ML model is trained. In other words, the SSC determines the fixed input of the ML model. So, the received information with the considered SSC is fed to the AI/ML positioning model. For the AI/ML positioning model, a previously described, the fixed input is a fixed set of input features. This set could include the input "shape": the dimensions of the input signal—for example, an AI/ML positioning model can be designed to process a 2-dimensional signal as input with a shape of 10*20 (10 rows and 20 columns). The term "size and shape" is used herein at times for the model input. Further, "type" refers to the source of information (e.g., a PRS at frequency f1 and f2 and occupying resource elements R1, R2, . . . , RN), and "type" may also be used to describe the fixed input set of features.

The LMF 190-1 configures, in block 409, the positioning receiver 165 to measure (e.g., and collect) positioning signals over n aggregated carriers, where each carrier comprises a signal of bandwidth b(n), comb c(n), duration d(n). Note that this configuration most often will not match with the configuration SSC used to train the AI/ML module 195.

In block 410, if unknown, the SSC may be communicated to the LMF 190-1 by the positioning receiver 165 either on demand, or in response to reception of the configuration received in block 409. This communication of the SSC may involve a new IE.

The LMF 190-1, in block 415, sends to the positioning receiver a (e.g., new) function f( ) which instructs the UE how to use the measured signals (those configured in block 409) to reconstruct/approximate missing signals required to obtain the SSC input that the AI/ML positioning module 195 is using. The function f( ) a function that approximates the missing entries using the measured ones, e.g., by means of interpolation, averaging, and the like. The LMF may select the function f( ) and weight list W based on the channel and interference conditions at the target UE for each of the used spectral resources. As examples, the function reconstructs entries that are missing in used positioning signals relative to a fixed input of the AI/ML positioning module, and then the weights are used to rank the reconstructed entries and the measured ones. The sending in block 415 may involve new IE(s). The function f( ) may be parameterized by at least:

a. The index of the missing resource signal; and
b. The indices of the measured resources used to reconstruct the missing resource signal.

The function f( ) should describe how the signal at missing resource (j) should be reconstructed using signal samples from measured resources (a, b, c, . . . ). That is, an AI/ML positioning model is trained assuming it will receive information in specific resource elements (based on the considered SSC). However, by changing the PRS/SRS configuration, those entries may not be included in the new PRS/SRS configuration, so these entries need to be interpolated from information received at other resource elements.

In addition to the function f( ) the LMF 190-1 sends (block 416) to the positioning receiver 165 a (e.g., new) weight list W, which indicates how the measured and reconstructed resources should be prioritized by the AI/ML positioning module 195. For example, a weight list W={1, 0, 1} indicates that resources indexed 1 and 3 have highest priority (since W(1)=W(3)=1), while resource indexed 2 has lowest priority (since W(2)=0). Note that the list is not necessarily Boolean, and various priority levels may be defined, e.g., very low, low, medium, high priority, and the like.

The function f and the weight list W may be carried in one or more (e.g., new) IEs, e.g., as part of the LPP/NRPPa assistance data.

In block 420, the positioning receiver 165 receives the positioning signals.

The positioning receiver 165 processes in block 425 the positioning signals. One example of this processing is illustrated by blocks 426-431. The positioning receiver 165 can perform the following for the processing:

a. applies the function f( ) to reconstruct missing signals (block 426);
b. performs a sanity check on the output of f( ) (and modification if not sane) (block 427);
c. combines the measured signals with the reconstructed ones (block 428);
d. applies the weight list W, with or without modification (e.g., depending on the results of the sanity check at step b) (block 429);
e. generates the fixed input for the AI/ML positioning module (block 430); and
f. runs the AI/ML positioning module with the generated fixed input from (e) to produce the positioning information for a requested measurement report (block 431).

The sanity check may be performed for the following. One expects that the interpolated signals should be in a range (i.e., sane), so out-of-range values (i.e., not sane) could be modified (possibly truncated) by the sanity check. The weight list W may be used, if desired, to emphasize/de-emphasize the information from a PRS signal in a frequency range (e.g., a carrier) in the positioning aggregation process.

For example, in case of high interference in one frequency range, the weight list W may help the positioning aggregation by de-emphasizing the measurements from that frequency range (e.g., carrier). As indicated by block 420, the weight list W may be modified by the sanity check, e.g., if part of the weight list W applies to the out-of-range values that have been truncated, that part of the weight list W would be modified, such as might not be used or could be set to a value such that the applied weight makes the output zero. Step (c) may not be necessary, but could be used to account for pre-processing on the input, e.g., to process results from block 420 (or earlier) to form the fixed input as necessary for the AI/ML positioning module.

It is noted that not all of the blocks 425-431 need to be performed. For instance, the blocks 426 and 431 may be used in a minimal implementation. In another example, the sanity check of block 427 could be skipped. Other options are possible, too.

In block 435, the positioning receiver 165 transfers the positioning measurement report, comprising indication of the positioning information, to the LMF 190-1, and it may additionally indicate the results of:

step (b), i.e., whether the sanity check is successful or not (block 436); and step (d), i.e., the weight list W which was eventually used (block 438).

The transfers in block 435 may use one or more new IEs.

In block 440, the LMF 190-1 uses the above report to update function f( ) and/or the weight list W.

In block 445, the LMF 190-1 may calculate (e.g., and use/send) the position of the UE. Although not part of the embodiments herein, the resultant calculated position can have many uses. The calculated position, for example, may be stored to have a history of UE locations in the LMF. Also, the calculated position can be used in other application/tasks like beam management, which the UE location helps point beams in the right direction. Emergency services and XR (extended reality) gaming are other use options.

Figure 5:
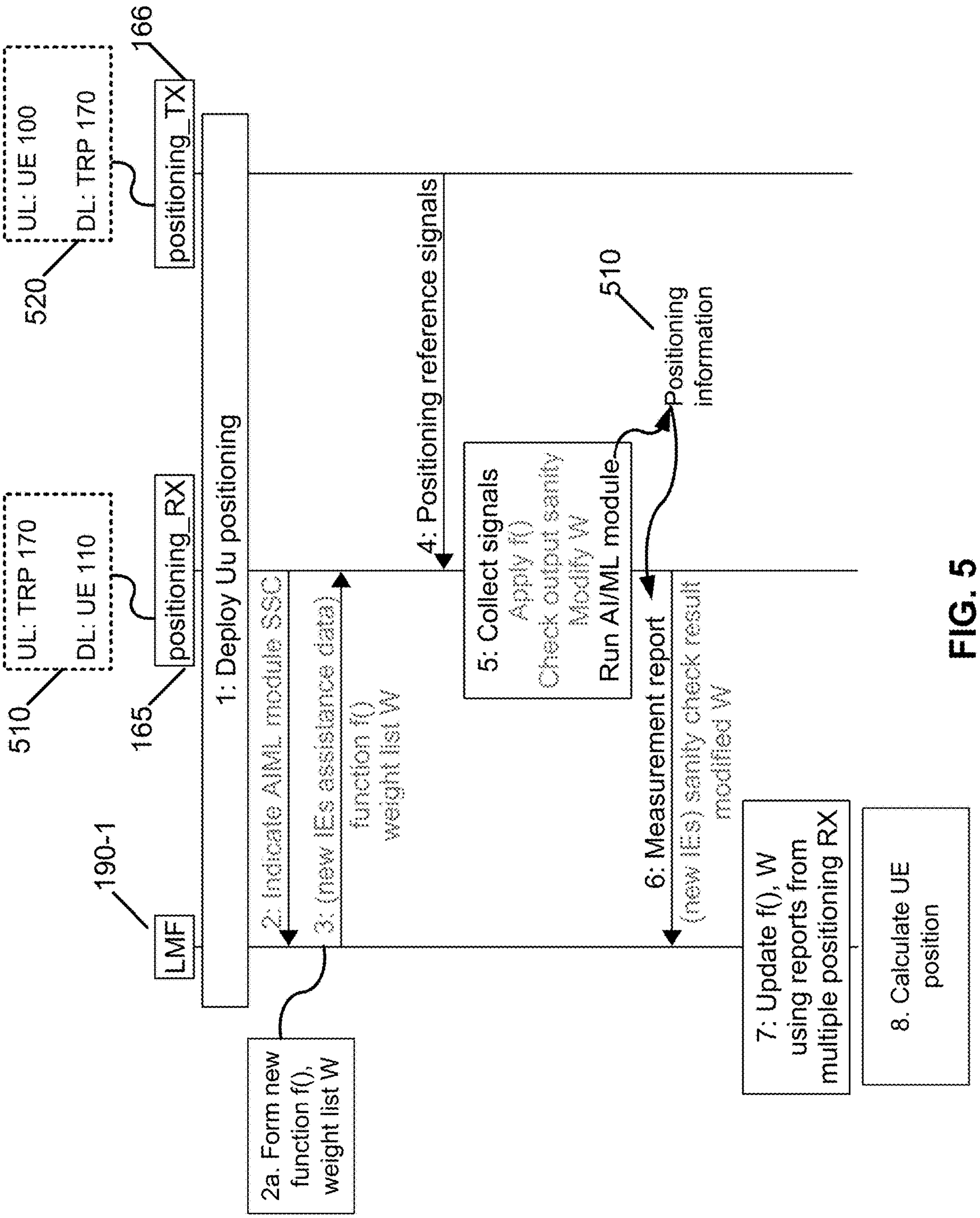
FIG. 5 is a signaling diagram in accordance with FIG. 4, where in UL positioning, positioning_RX=a TRP and the positioning_TX=UE, while in DL positioning, positioning_RX=UE and positioning_TX=TRP.

Turning to FIG. 5, this figure is a signaling diagram in accordance with FIG. 4, where in UL positioning, positioning_RX 165 may be a TRP 170 and the positioning_TX 166 may be a UE, while in DL positioning, positioning_RX 165 may be a UE and positioning_TX 166 may be a TRP. Block 510 is used to indicate which entity is used for UL and DL for the positioning_RX 165, while block 520 is used to indicate which entity is used for UL and DL for the positioning_TX 166.—In UL positioning, the TRP 170 may use the AI/ML positioning module to extract positioning measurements, which are then forwarded to the LMF 190-1. The LMF 190-1 may itself use AI/ML positioning module to compute the UE location. It is noted that the TRP 170 itself does not compute UE location for privacy reasons. In DL positioning, the UE 110 may use AI/ML positioning module to either extract positioning measurements (then used similarly by the LMF 190-1) or may use AI/ML positioning module to compute its own position estimate. It is noted that for DL and steps 2, 3, and 6, communications go between the UE (as positioning_RX 165) and the LMF 190-1. The UE may communicate directly with the LMF via the LPP interface. The positioning framework is purposely performed transparent to the TRP for privacy purpose.

In step 1, Uu positioning is deployed between the LMF 190-1, the positioning_RX 165, and the positioning_TX 166. In step 2, the positioning_RX 165 indicates AIML positioning module 195's SSC. In step 2*a*, the LMF 190-1 forms the new function f( ) and possibly the weight list W. Step 3 in this example uses new IEs with assistance data (e.g., LPP or NRPPa). These are used for indicating the function f( ) and weight list W. The positioning_TX 166 sends positioning reference signals in step 4 to the positioning_RX 165.

In step 5, the positioning_RX 165 performs (measuring and) collecting signals, applying the function f( ) checking the output sanity, modifying the weight list W, and running the AL/ML positioning module 195 to determine positioning information 510 used to populate a measurement report. The positioning_RX 165 sends the measurement report to the LMF 190-1 in step 6, and this includes indication of the positioning information 510. The measurement report may include the sanity check result and/or the modified weight list W. This may be sent using one or more new IEs. In step 7, the LMF 190-1 updates f( ) and/or the weight list W using reports from one or multiple positioning_RXs 165. In step 8, the LMF 190-1 calculates the position of the UE.

More details about the function f( ) are presented now. The role of function f( ) is to construct the desired fixed input of AI/ML positioning module 196 using the measured signal. Thus, it is likely that some of the resource elements in the desired shape need to be interpolated. This functionality may depend on the propagation properties of the environment, e.g., the function f( ) may use the time-frequency correlation information for interpolating the missing resource elements. Although the simplest way of obtaining an ML fixed input with the desired shape is to use a zero-padding technique, this may lead to performance loss due to synthetically added elements that do not match with the expected correlation between resource elements. The function f( ) is a way to feed environment-specific information to AI/ML positioning modules, which may be trained in a way to be generic to different environments and/or scenarios.

For example, if the receiver identifies that a signal sample at entry (fx, tx) (where fx is a frequency index, and tx is a time index) is missing, then the receiver applies function f( ) on the measured samples ym to reconstruct the missing signal ye(fx, tx):

$$ye(fx, tx) = f(y, fx, tx),$$

where the function f( ) is parameterized at least by the following:

measured signal samples y; and the time and frequency indices of the missing entry.

Exemplary functions f( ) include the Wiener filter, weighted average, and the like.

For the weight list W, more details are described now. The weight list W determines the reliability of measurements in different carriers. It may contain historical information with respect to the success/failure of providing accurate information in previous experiments. Therefore, the weight list relies more on some carriers, resulting in higher positioning accuracy. In addition, the weight list may implicitly indicate the current level of interference caused by other nodes at different aggregated carriers.

For example, a weight list W=[2 1 0] for three carriers f1, f2, f3 could indicate to the receiver that carrier f1 is the most reliable (since its weight W(1) is highest), while carrier f3 is the least reliable (since W(3)=0).

The positioning receiver 165 may use a sanity check on the interpolated elements. The output of sanity check can be fed back to the LMF 190-1 for possible updates of the interpolation function f( ) in the future. In addition, the positioning receiver may update the received weight list W based on the positioning accuracy (e.g., variance). That is, all the positioning methods can be seen in estimation theory, so their estimation is not perfect, and these methods can provide a possible variance of their estimation. This variance of the positioning error can be used for purposes such as updating the weight list W. Then, the positioning receiver 165 shares the updated weight list with the LMF 190-1.

Without in any way limiting the scope, interpretation, or application of the claims appearing below, a technical effect and advantage of one or more of the example embodiments disclosed herein is that the proposed examples may enable the LMF 190-1 to support ML-based positioning at the gNB and UEs, where most likely the input size of ML models are different. By providing the interpolation function f( ) ML-based positioning solutions become compatible with different configurations like BWs, comb settings, and numbers of OFDM symbols. Another technical effect and advantage of one or more of the example embodiments disclosed herein is providing environment/scenario specific information about propagation properties of the environment and interference level of different carriers to carrier-aggregation positioning solutions.

The following are additional examples:

Example 1. A method, comprising:

receiving, by a node in a wireless communications system from another node in the wireless communications system, reference signals for determining positioning information corresponding to a user equipment in the wireless communication system;

measuring, by the node, the reference signals;

applying, by the node, a function to the measured reference signals to form an output corresponding to a fixed set of input features;

determining, by the node, the positioning information of the user equipment using the output; and sending a measurement report, comprising indication of the positioning information, from the node toward a further node in the wireless communications system.

Example 2. The method according to example 1, wherein the function produces the output corresponding to the fixed set of input features when fed with positioning signals that are one or both of:

aggregated over a variable number of carriers; or of variable size in time and frequency domains.

Example 3. The method according to any one of examples 1 or 2, wherein the applying comprises identifying that a signal sample at entry (fx, tx), having a frequency index fx and time index tx, is missing, applying the function on measured samples ym to reconstruct a missing signal ye(fx, tx):

$$ye(fx,tx)=f(y,fx,tx),$$

where the function f( ) is parameterized at least by the following:

measured signal samples y; and the time and frequency indices of the missing entry.

Example 4. The method according to any one of examples 1 to 3, further comprising performing a check on the output corresponding to the fixed set of input features, and performing one or more modifications corresponding to the output in response to at least part of the output not being within a range.

Example 5. The method according to any one of examples 1 to 4, further comprising, after applying the function but before determining the positioning information, applying a list of weights, individual weights applied to corresponding individual carriers in the output.

Example 6. The method according to examples 4 and 5, wherein the one or more modifications are applied to part of the list of weights based on the check indicating the output was not in range and based on the weights that apply to the part of the output that was not in range.

Example 7. The method according to any of examples 5 or 6, wherein indications of the function and the weight list are carried in one or more information elements as part of one of long-term evolution positioning protocol assistance data or new radio positioning protocol A assistance data.

Example 8. The method according to any one of examples 5 to 7, wherein sending the measurement report comprises sending one or both of indication of a result of the check on the output or indication of the list of weights actually used.

Example 9. The method according to any one of examples 1 to 8, wherein the determining the positioning information of the user equipment using the output uses a positioning module that was previously trained to produce positioning information based on input having the fixed set of input features.

Example 10. The method according to any one of examples 1 to 9, wherein the node sends a configuration defining at least a number of aggregated carriers, bands, and durations used for the fixed set of input features.

Example 11. The method according to any one of examples 1 to 10, wherein the node and further node are as follows:

for uplink, the node is a base station and the other node is the user equipment; and for downlink, the node is the user equipment and the other node is the base station.

Example 12. A method, comprising:

for a wireless communications system where a node measures positioning reference signals sent from another node, sending from a further node in the wireless communications system to the node indication of a function to be used by the node to apply to positioning reference signals to form an output of a fixed set of input features used to determine positioning information for a user equipment in the wireless communications system;

receiving, by the further node, a measurement report comprising at least indication of the positioning information based at least on the positioning reference signals and the function; and updating, by the further node. at least the function based at least on the measurement report.

Example 13. The method according to example 12, wherein:

the method further comprises receiving indication of a configuration that defines at least a number of aggregated carriers, bands, and durations used for the fixed set of input features;

forming the function based at least on the configuration; and sending the indication of the function comprises sending the indication of the formed function.

Example 14. The method according to any one of examples 12 or 13, wherein the receiving the measurement report further comprises receiving a result of a check as to whether or not the output is within a range, and using the result to update the function.

Example 15. The method according to any one of examples 12 to 14, comprising determining a list of weights, wherein individual weights are to be applied to corresponding individual carriers in the output, and sending indication of the list of weights from the further node to the node.

Example 16. The method according to example 15, wherein the receiving the measurement report further comprises receiving indication of weights actually used for the positioning information, and wherein the method further comprises updating the list of weights based on the indication of weights actually used.

Example 17. A computer program, comprising instructions for performing the methods of any of examples 1 to 16, when the computer program is run on an apparatus.

Example 18. The computer program according to example 17, wherein the computer program is a computer program product comprising a computer-readable medium bearing instructions embodied therein for use with the apparatus.

Example 19. The computer program according to example 17, wherein the computer program is directly loadable into an internal memory of the apparatus.

Example 20. An apparatus, comprising means for performing:

receiving, by a node in a wireless communications system from another node in the wireless communications system, reference signals for determining positioning information corresponding to a user equipment in the wireless communication system;

measuring, by the node, the reference signals;

applying, by the node, a function to the measured reference signals to form an output corresponding to a fixed set of input features;

determining, by the node, the positioning information of the user equipment using the output; and sending a measurement report, comprising indication of the positioning information, from the node toward a further node in the wireless communications system.

Example 21. The apparatus according to example 20, wherein the function produces the output corresponding to the fixed set of input features when fed with positioning signals that are one or both of:

aggregated over a variable number of carriers; or of variable size in time and frequency domains.

Example 22. The apparatus according to any one of examples 20 or 21, wherein the applying comprises identifying that a signal sample at entry (fx, tx), having a frequency index fx and time index tx, is missing, applying the function on measured samples ym to reconstruct a missing signal ye(fx, tx):

$$ye(fx, tx) = f(y, fx, tx),$$

where the function f( ) is parameterized at least by the following:

measured signal samples y; and the time and frequency indices of the missing entry.

Example 23. The apparatus according to any one of examples 20 to 22, wherein the means are further configured for performing: performing a check on the output corresponding to the fixed set of input features, and performing one or more modifications corresponding to the output in response to at least part of the output not being within a range.

Example 24. The apparatus according to any one of examples 20 to 23, wherein the means are further configured for performing, after applying the function but before determining the positioning information, applying a list of weights, individual weights applied to corresponding individual carriers in the output.

Example 25. The apparatus according to examples 23 and 24, wherein the one or more modifications are applied to part of the list of weights based on the check indicating the output was not in range and based on the weights that apply to the part of the output that was not in range.

Example 26. The apparatus according to any of examples 24 or 25, wherein indications of the function and the weight list are carried in one or more information elements as part of one of long-term evolution positioning protocol assistance data or new radio positioning protocol A assistance data.

Example 27. The apparatus according to any one of examples 24 to 26, wherein sending the measurement report comprises sending one or both of indication of a result of the check on the output or indication of the list of weights actually used.

Example 28. The apparatus according to any one of examples 20 to 27, wherein the determining the positioning information of the user equipment using the output uses a positioning module that was previously trained to produce positioning information based on input having the fixed set of input features.

Example 29. The apparatus according to any one of examples 20 to 28, wherein the node sends a configuration defining at least a number of aggregated carriers, bands, and durations used for the fixed set of input features.

Example 30. The apparatus according to any one of examples 20 to 29, wherein the node and further node are as follows:

for uplink, the node is a base station and the other node is the user equipment; and for downlink, the node is the user equipment and the other node is the base station.

Example 31. An apparatus, comprising means for performing:

for a wireless communications system where a node measures positioning reference signals sent from another node, sending from a further node in the wireless communications system to the node indication of a function to be used by the node to apply to positioning reference signals to form an output of a fixed set of input features used to determine positioning information for a user equipment in the wireless communications system;

receiving, by the further node, a measurement report comprising at least indication of the positioning information based at least on the positioning reference signals and the function; and updating, by the further node, at least the function based at least on the measurement report.

Example 32. The apparatus according to example 31, wherein:

the means are further configured for performing receiving indication of a configuration that defines at least a number of aggregated carriers, bands, and durations used for the fixed set of input features;

forming the function based at least on the configuration; and sending the indication of the function comprises sending the indication of the formed function.

Example 33. The apparatus according to any one of examples 31 or 32, wherein the receiving the measurement report further comprises receiving a result of a check as to whether or not the output is within a range, and using the result to update the function.

Example 34. The apparatus according to any one of examples 31 to 33, comprising determining a list of weights, wherein individual weights are to be applied to corresponding individual carriers in the output, and sending indication of the list of weights from the further node to the node.

Example 35. The apparatus according to example 34, wherein the receiving the measurement report further comprises receiving indication of weights actually used for the positioning information, and wherein the means are further configured for performing: updating the list of weights based on the indication of weights actually used.

Example 36. An apparatus, comprising:

one or more processors; and one or more memories storing instructions that, when executed by the one or more processors, cause the apparatus at least to perform:

receiving, by a node in a wireless communications system from another node in the wireless communications system, reference signals for determining positioning information corresponding to a user equipment in the wireless communication system;

measuring, by the node, the reference signals;

applying, by the node, a function to the measured reference signals to form an output corresponding to a fixed set of input features;

determining, by the node, the positioning information of the user equipment using the output; and sending a measurement report, comprising indication of the positioning information, from the node toward a further node in the wireless communications system.

Example 37. The apparatus according to example 36, wherein the function produces the output corresponding to the fixed set of input features when fed with positioning signals that are one or both of:

aggregated over a variable number of carriers; or of variable size in time and frequency domains.

Example 38. The apparatus according to any one of examples 36 or 37, wherein the applying comprises identifying that a signal sample at entry (fx, tx), having a frequency index fx and time index tx, is missing, applying the function on measured samples ym to reconstruct a missing signal ye(fx, tx):

$$ye(fx, tx) = f(y, fx, tx),$$

where the function f( ) is parameterized at least by the following:

measured signal samples y; and the time and frequency indices of the missing entry.

Example 39. The apparatus according to any one of examples 36 to 38, wherein the one or more memories further store instructions that, when executed by the one or more processors, cause the apparatus at least to perform: performing a check on the output corresponding to the fixed set of input features, and performing one or more modifications corresponding to the output in response to at least part of the output not being within a range.

Example 40. The apparatus according to any one of examples 36 to 39, wherein the one or more memories further store instructions that, when executed by the one or more processors, cause the apparatus at least to perform: after applying the function but before determining the positioning information, applying a list of weights, individual weights applied to corresponding individual carriers in the output.

Example 41. The apparatus according to examples 39 and 40, wherein the one or more modifications are applied to part of the list of weights based on the check indicating the output was not in range and based on the weights that apply to the part of the output that was not in range.

Example 42. The apparatus according to any of examples 40 or 41, wherein indications of the function and the weight list are carried in one or more information elements as part of one of long-term evolution positioning protocol assistance data or new radio positioning protocol A assistance data.

Example 43. The apparatus according to any one of examples 40 to 42, wherein sending the measurement report comprises sending one or both of indication of a result of the check on the output or indication of the list of weights actually used.

Example 44. The apparatus according to any one of examples 36 to 43, wherein the determining the positioning information of the user equipment using the output uses a positioning module that was previously trained to produce positioning information based on input having the fixed set of input features.

Example 45. The apparatus according to any one of examples 36 to 44, wherein the node sends a configuration defining at least a number of aggregated carriers, bands, and durations used for the fixed set of input features.

Example 46. The apparatus according to any one of examples 36 to 45, wherein the node and further node are as follows:

for uplink, the node is a base station and the other node is the user equipment; and for downlink, the node is the user equipment and the other node is the base station.

Example 47. An apparatus, comprising:

one or more processors; and one or more memories storing instructions that, when executed by the one or more processors, cause the apparatus at least to perform:

for a wireless communications system where a node measures positioning reference signals sent from another node, sending from a further node in the wireless communications system to the node indication of a function to be used by the node to apply to positioning reference signals to form an output of a fixed set of input features used to determine positioning information for a user equipment in the wireless communications system;

receiving, by the further node, a measurement report comprising at least indication of the positioning information based at least on the positioning reference signals and the function; and updating, by the further node, at least the function based at least on the measurement report.

Example 48. The apparatus according to example 47, wherein:

the one or more memories further store instructions that, when executed by the one or more processors, cause the apparatus at least to perform: receiving indication of a configuration that defines at least a number of aggregated carriers, bands, and durations used for the fixed set of input features;

forming the function based at least on the configuration; and sending the indication of the function comprises sending the indication of the formed function.

Example 49. The apparatus according to any one of examples 47 or 48, wherein the receiving the measurement report further comprises receiving a result of a check as to whether or not the output is within a range, and using the result to update the function.

Example 50. The apparatus according to any one of examples 47 to 49, comprising determining a list of weights, wherein individual weights are to be applied to corresponding individual carriers in the output, and sending indication of the list of weights from the further node to the node.

Example 51. The apparatus according to example 50, wherein the receiving the measurement report further comprises receiving indication of weights actually used for the positioning information, and wherein the one or more memories further store instructions that, when executed by the one or more processors, cause the apparatus at least to perform: updating the list of weights based on the indication of weights actually used.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1A. A computer-readable medium may comprise a computer-readable storage medium (e.g., memories 125 or other device) that may be any media or means that can contain, store, and/or transport the instructions for use by or in connection with an instruction execution system, apparatus, or device, such as a computer. A computer-readable storage medium does not comprise propagating signals, and therefore may be considered to be non-transitory. The term "non-transitory", as used herein, is a limitation of the medium itself (i.e., tangible, not a signal) as opposed to a limitation on data storage persistency (e.g., RAM, random access memory, versus ROM, read-only memory).

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP third generation partnership project
5G fifth generation
AI artificial intelligence
AI/ML or AIML artificial intelligence, machine learning
AMF access and mobility management function
BBU base band unit
BS base station
BW bandwidth
CFO carrier frequency offset
CSI channel state information
CU central unit
DL downlink (from base station to UE)
DU distributed unit
eNB (or eNodeB) evolved Node B (e.g., an LTE base station)
gNB (or gNodeB) base station for 5G/NR
IE information element
I/F interface
LMF location management function
LPP LTE positioning protocol
LTE long term evolution
ML machine learning
MME mobility management entity
ng or NG next generation
NR new radio
NRPPa NR positioning protocol A
N/W or NW network
OFDM orthogonal frequency division multiplexed
PFL positioning frequency layer
PN phase noise
PRB physical resource block
PRS positioning reference signal
RAN radio access network
Re release
RE resource element
RF radio frequency
RSTD reference signal timing difference
RTOA relative time of arrival
RRC radio resource control
RRH remote radio head
RRM radio resource management
RDU roadside unit RU radio unit
Rx or RX receiver
SGW serving gateway
SMF session management function
SRS sounding reference signal
SSC selected standard configuration
TRP transmission-reception (or transmit-receive) point
TS technical specification
Tx or TX transmitter
UE user equipment (e.g., a wireless, typically mobile device)
UL uplink (from UE to base station)
UPF user plane function
WI work item
WID work item description

What is claimed is:

1. An apparatus, comprising:
one or more processors; and
one or more memories storing instructions that, when executed by the one or more processors, cause the apparatus at least to perform:
receive, by a node in a wireless communications system from another node in the wireless communications system, reference signals for determining positioning information corresponding to a user equipment in the wireless communication system;
measure, by the node, the reference signals;
select a function f( ) and a list of weights based on channel and interference conditions at the user equipment for each of used spectral resources, the weight list being based on historical information with respect to success or failure of providing accurate information and indicating a current level of interference caused by other nodes at different aggregated carriers;
apply, by the node, the function f( ) to the measured reference signals to form an output corresponding to a fixed set of input features, wherein the function f( ) produces the output corresponding to the fixed set of input features when fed with positioning signals that are both: aggregated over a variable number of carriers, and of variable size in time and frequency domains, wherein the applying the function f( ) comprises:
identifying that a signal sample at entry (fx, tx), having a frequency index fx and time index tx, is missing,
applying the function f( ) on measured samples ym to reconstruct a missing signal ye(fx, tx): ye(fx, tx)=f(y, fx, tx),
where the function f( ) is parameterized at least by the following:
measured signal samples y, and
the time and frequency indices of the missing entry;
perform a check on the output corresponding to the fixed set of input features, and perform one or more modifications corresponding to the output in response to at least part of the output not being within a range, wherein the one or more modifications are applied to part of the list of weights based on the check indicating the output was not in range and based on the weights that apply to the part of the output that was not in range;
after applying the function f( ) but before determining the positioning information, apply a list of weights, wherein individual respective weights of the list of weights are applied to corresponding individual respective carriers in the output, wherein the list of weights are applied to emphasize carriers in particular frequency ranges and to de-emphasize carriers in high-interference frequency ranges;
determine, by the node, the positioning information of the user equipment using the output using a positioning module that was previously trained to produce positioning information based on input having the fixed set of input features;
update the list of weights based on variance of positioning error; and
send a measurement report, comprising indication of the positioning information, from the node toward a further node in the wireless communications system, wherein sending the measurement report comprises sending both of: an indication of a result of the check on the output, and an indication of the list of weights actually used,
wherein the node and further node are as follows:
for uplink, the node is a base station and the other node is the user equipment, and
for downlink, the node is the user equipment and the other node is the base station.

* * * * *